United States Patent
Forster et al.

(10) Patent No.: US 10,247,162 B2
(45) Date of Patent: Apr. 2, 2019

(54) STARTER FOR A COMBINED HEAT AND POWER UNIT

(71) Applicant: EC Power A/S, Hinnerup (DK)

(72) Inventors: Jesper Forster, Risskov (DK); Claus Esbensen, Hinnerup (DK)

(73) Assignee: EC POWER A/S, Hinnerup (DK)

( * ) Notice: Subject to any disclaimer, the term of this patent is extended or adjusted under 35 U.S.C. 154(b) by 0 days.

(21) Appl. No.: 15/580,729

(22) PCT Filed: Jun. 8, 2016

(86) PCT No.: PCT/EP2016/063071
§ 371 (c)(1),
(2) Date: Dec. 8, 2017

(87) PCT Pub. No.: WO2016/198474
PCT Pub. Date: Dec. 15, 2016

(65) Prior Publication Data
US 2018/0142660 A1    May 24, 2018

(30) Foreign Application Priority Data
Jun. 8, 2015   (GB) .................................. 1509913.8

(51) Int. Cl.
*H02J 3/18* (2006.01)
*H02K 7/18* (2006.01)
(Continued)

(52) U.S. Cl.
CPC ............ *F02N 11/087* (2013.01); *F02N 11/04* (2013.01); *F02N 11/14* (2013.01); *H02J 3/1885* (2013.01);
(Continued)

(58) Field of Classification Search
USPC .................................. 290/2, 44; 322/29, 47
See application file for complete search history.

(56) References Cited

U.S. PATENT DOCUMENTS 3,107,438 A * 10/1963 Church .................... G09B 9/22
340/384.3
4,417,194 A * 11/1983 Curtiss .................. H02J 3/1835
290/40 B
(Continued)

FOREIGN PATENT DOCUMENTS

DE            19610915 A1     9/1997

OTHER PUBLICATIONS

United Kingdom Search Report for corresponding application GB1509913.8: Report dated Jan. 13, 2016.
(Continued)

*Primary Examiner* — Pedro J Cuevas
(74) *Attorney, Agent, or Firm* — Cantor Colburn LLP

(57) ABSTRACT

A starter system for start up of a combined heat and power unit comprising a generator which is connectable to the grid. The starter system comprises a variable frequency drive, VFD, operable to receive power from the grid. The VFD reduces the frequency of the power, and provides the reduced-frequency power to the generator to start the generator. The starter system further comprises a bypass relay configured to bypass the VFD. The bypass relay allows direct connection between the grid and the generator after the generator has started. The variable frequency drive is configured to operate temporarily during start up of the combined heat and power unit.

20 Claims, 3 Drawing Sheets

(51) Int. Cl.
*H02P 9/08* (2006.01)
*F02N 11/04* (2006.01)
*F02N 11/08* (2006.01)
*H02K 9/00* (2006.01)
*H02P 1/16* (2006.01)
*H02P 9/42* (2006.01)
*F02N 11/14* (2006.01)
*H02P 101/25* (2016.01)

(52) U.S. Cl.
CPC ............ *H02K 7/1815* (2013.01); *H02K 9/00* (2013.01); *H02P 1/166* (2013.01); *H02P 9/08* (2013.01); *H02P 9/42* (2013.01); *F02N 2011/0874* (2013.01); *F02N 2200/062* (2013.01); *F02N 2200/063* (2013.01); *F02N 2250/02* (2013.01); *H02P 2101/25* (2015.01); *Y02E 20/14* (2013.01); *Y02E 40/32* (2013.01)

(56) References Cited

U.S. PATENT DOCUMENTS

| | | | | | |
|---|---|---|---|---|---|
| 4,473,792 | A | * | 9/1984 | Nola | H02J 3/46 307/87 |
| 4,656,413 | A | * | 4/1987 | Bourbeau | H02P 9/105 307/87 |
| 4,906,060 | A | * | 3/1990 | Claude | F03D 7/0272 290/44 |
| 5,252,905 | A | | 10/1993 | Wills | |
| 5,416,398 | A | | 5/1995 | Blatter | |
| 5,642,006 | A | * | 6/1997 | Cech | H02J 3/42 290/40 R |
| 5,804,953 | A | * | 9/1998 | Bowyer | H02M 1/10 323/256 |
| 5,920,467 | A | * | 7/1999 | Bowyer | H02M 1/10 323/256 |
| 5,982,116 | A | * | 11/1999 | Yang | H02P 5/50 318/77 |
| 5,998,976 | A | | 12/1999 | Steffan | |
| 6,140,803 | A | * | 10/2000 | Hurley | H02J 3/42 307/87 |
| 6,239,997 | B1 | * | 5/2001 | Deng | H02J 3/38 363/95 |
| 6,323,624 | B1 | * | 11/2001 | Henriksen | H02J 3/40 322/20 |
| 7,268,443 | B2 | * | 9/2007 | Kikuchi | F03D 9/255 290/44 |
| 7,615,880 | B2 | * | 11/2009 | Kikuchi | F03D 9/25 290/44 |
| 7,646,178 | B1 | * | 1/2010 | Fradella | H02K 1/2793 322/22 |
| 7,859,125 | B2 | * | 12/2010 | Nielsen | F03D 7/0272 290/44 |
| 7,952,216 | B2 | * | 5/2011 | Kikuchi | F03D 9/255 290/44 |
| 7,957,844 | B2 | * | 6/2011 | Messing | H02H 3/46 318/621 |
| 8,242,620 | B2 | * | 8/2012 | Kikuchi | F03D 9/255 290/44 |
| 8,466,573 | B2 | * | 6/2013 | Kikuchi | F03D 9/255 290/44 |
| 8,723,344 | B1 | * | 5/2014 | Dierickx | F03G 7/08 290/1 R |
| 9,276,515 | B2 | * | 3/2016 | Yeh | H02P 25/02 |
| 2003/0213246 | A1 | * | 11/2003 | Coll | F01K 17/02 60/653 |
| 2008/0174257 | A1 | | 7/2008 | Schnetzka | |
| 2009/0079193 | A1 | * | 3/2009 | Nielsen | F03D 7/0272 290/44 |
| 2009/0218962 | A1 | | 9/2009 | Kubal | |
| 2010/0306458 | A1 | | 12/2010 | Aho | |
| 2011/0248654 | A1 | | 10/2011 | Graner | |
| 2011/0309805 | A1 | | 12/2011 | Matveev | |
| 2015/0048775 | A1 | * | 2/2015 | Yeh | H02P 25/02 318/806 |

OTHER PUBLICATIONS

International Search Report for corresponding application PCT/EP2016/063071 filed Jun. 8, 2016; dated Aug. 31, 2016.
Written Opinion of the International Searching Authority for corresponding application PCT/EP2016/063071 filed Jun. 8, 2016; dated Aug. 31, 2016.

* cited by examiner

STARTER FOR A COMBINED HEAT AND POWER UNIT

The invention relates to a starter for a combined heat and power (CHP) unit. CHP units are used to produce electrical power at the same time as producing heat. A CHP unit may comprise an induction generator and prime-mover, such as a combustion engine. The prime-mover may be fitted with heat exchangers and the like for recovery of heat and the generator may be used to convert the mechanical energy produced by the prime-mover into electricity (by movement of a rotor relative to a stator in the generator).

In order to start up a CHP unit, the unit's generator is energized and used as a starter motor to start the prime-mover. Starting a prime-mover typically requires a high torque. For example a combustion engine requires around twice the nominal torque in order to power the intake and compression strokes of the first cycle of the engine. Additionally, the generator itself resists self-starting, and this resistance must be overcome by the provision of additional torque. Since the torque provided by the generator is proportional to the current drawn by the generator, the generator must draw several times its normal full-load current when first energized to overcome the first compression of the engine and the resistance to self-starting of the generator. That is, a very high initial input current (inrush current) must be drawn from the electrical grid in order to start up the CHP unit. The inrush current drawn from the grid may be in excess of 100 A. This puts a great deal of strain on the grid connection, and necessitates a grid connection with a high rating. In addition, the inrush current drawn from the grid may exceed allowable limits in some regions. Consequently the inrush current drawn from the grid must be limited to an acceptable level.

A known method of addressing this problem is to connect the CHP directly to the grid, and to provide a soft starter. The soft starter temporarily reduces the current load (i.e. the inrush current drawn from the grid and provided to the generator), but has the disadvantage that this also reduces the torque provided by the generator. A further disadvantage is that the generator operates very inefficiently when operated with a soft starter. Therefore, the generator rotor will heat up very quickly (within a time period of the order of 10 seconds). Heating of the rotor leads to a further reduction of the torque provided by the generator. Additionally, excessive heating reduces the reliability and service life of the generator.

Alternatively, instead of using a soft starter, a variable frequency drive (VFD) (also known as a frequency converter or frequency inverter) may be used. Here, instead of connecting the CHP unit directly to the grid, a VFD is permanently interposed between the CHP and the grid, and is in constant operation during start up and normal operation (i.e. post-start up) of the CHP. Such prior art VFDs are also referred to herein as "continuous-use VFDs".

A VFD comprises an input stage (also referred to herein as a grid-side stage) and an output stage (also referred to herein as a generator-side stage). Whilst the power in each stage is approximately the same, the voltage, frequency and current can be different in each stage. This allows a large starting current (inrush current) to be provided to the generator, without drawing a correspondingly large inrush current from the grid.

The VFD starts rotation of the generator slowly by reducing the voltage and frequency provided to the generator (the reduction is compared to the grid voltage and frequency), and then ramps up the frequency and voltage. It is then possible to start the CHP unit within seconds, whilst limiting the inrush current drawn from the grid (i.e. within the input stage, or grid-side stage of the VFD) to the nominal current value or less, and still providing a large inrush current to the generator. This also provides a very smooth start up. However, the use of a VFD is disadvantageous because the VFD consumes a significant amount of energy and dissipates a significant amount of heat (there is a loss of typically 5% to 10% between the grid side and the generator side), and is therefore very inefficient during normal use of the CHP unit, after start up. Additionally, the VFD is a rather complex part, and requires the provision of a well-designed heat exchange and removal system (comprising fins and fans, for example) in order to protect the VFD from the heat generated during operation of the VFD whilst the CHP is operating. This greatly increases the size of the VFD (by about an order of magnitude) compared to a soft starter used to start the same CHP.

The inventors of the present invention have recognised that it would be desirable to provide an improved starter system for a CHP which addresses the above disadvantages of the prior art.

Therefore, according to a first aspect of the present invention there is provided a starter system for start up of a combined heat and power unit comprising a generator which is connectable to the grid, wherein the starter system comprises: a variable frequency drive operable to receive power from the grid, to reduce the frequency of the power, and to provide the reduced-frequency power to the generator to start the generator; and a bypass relay configured to bypass the variable frequency drive, allowing direct connection between the grid and the generator after the generator has started, and wherein the variable frequency drive is configured to operate temporarily during start up of the combined heat and power unit.

By "direct connection" it is meant that the power flow between the grid and generator does not pass via the VFD, such that during normal operation of the CHP unit it is possible to bypass the VFD. The grid refers to a power source such as a mains electricity supply, generally a three phase supply, for example a supply drawn from a national grid.

"Start up" of the CHP unit refers to the process of starting the generator and prime-mover of the CHP unit, which is a combustion engine in the preferred example described below. The start up process commences with the initial connection of the generator to the grid (via the VFD), and ends when the prime-mover has been activated, for example when combustion begins in the engine. Once the prime-mover has been activated, the CHP is in normal (post-start up) operation. As discussed below, the VFD may operate temporarily during a part of the start-up process, and the bypass relay may be used for a direct connection during another part of the start-up process, for example after the generator has begun to turn, but before the prime-mover of the combined heat and power unit has been activated.

Advantageously, a starter system according to the first aspect of the present invention allows the inrush current drawn from the grid to be limited to acceptable levels during start up of the CHP (by virtue of the provision of the VFD) and also allows the VFD to be bypassed once the generator is running, allowing direct connection between the generator and grid. The bypass relay has a significantly higher efficiency than the VFD (the electrical efficiency of a VFD is approximately 90 to 95%) and so by closing the bypass relay in normal operation (i.e. after start up), the total efficiency of the CHP is increased significantly. In this way the CHP can operate efficiently both during the start phase and during normal operation. In the prior art VFDs are not used in this way as they are considered to be too complex and costly for such a use. However, the inventors have made the non-obvious realisation that when the VFD is only required to operate at maximum capacity for a very short period of time, i.e. controlling the inrush current drawn from the grid during a short time during start-up, then the disadvantages of complexity and cost can be avoided.

The starter system may have a reduced amount of heat dissipation devices and/or a reduced amount of electrical shielding compared to prior art VFD devices intended for continuous use. This allows the size, weight, complexity and cost of the VFD to be greatly reduced, and hence reduces the size, weight, complexity and cost of the starter system. In preferred embodiments the starter system has heat dissipation devices that would be insufficient for dissipation of heat from the VFD in continuous operation and/or the starter system has electrical shielding that would be inadequate for allowing the VFD to be used in continuous operation.

Since the VFD is configured to operate at its maximum capacity temporarily during start up (i.e. only for a short time), then much less heat is generated compared to a configuration in which the VFD operates continuously whilst the CHP is operating. For the same reason, there is a far smaller risk arising from the electrical field generated by the device. This means that embodiments of the present invention are much more efficient compared to prior art systems, and do not require extensive heat dissipation apparatus or electrical shielding, both of which are required in prior art systems with a continuous-use VFD. The VFD used in the present invention can therefore be smaller and cheaper than a prior art continuous-use VFD.

In preferred embodiments, the starter system does not include any heat exchangers (either active or passive, and for example fins and/or fans) for dissipating heat generated by the VFD. Of course some heat dissipation is to be expected from the components and/or any casing/mounting of the VFD, but aside from this, in preferred examples no components are provided whose purpose is expressly or solely to dissipate heat generated by the VFD. Advantageously, this reduces the size, weight, complexity and cost of the starter system. As there is no need for heat exchange components, the starter system is able to be sized to have the same dimensions (or smaller) as existing soft starters, allowing the starter system to be retrofitted to a CHP by replacement of an existing soft starter with the starter system.

Preferably, the starter system does not include any electrical shielding for shielding the starter system from electromagnetic fields generated by the VFD or bypass relay. During normal operation of the CHP system (i.e. once internal combustion within the engine has begun) the VFD is generally inactive and the bypass relay is active; the bypass relay does not need any shielding for electromagnetic fields. Some degree of shielding may be provided by the presence of any casing/mounting of the starter system, but aside from this, no components are provided whose purpose is expressly or solely to shield the electromagnetic fields generated by the VFD or bypass relay. Advantageously, this reduces the size, weight, complexity and cost of the starter system. There may of course be other components in the starter system, such as power supplies, that require some shielding.

Preferably, the input stage (grid-side stage) of the VFD comprises diodes. This is a cheaper and more robust alternative to prior art continuous-use VFDs, which utilise IGBTs in the input stage.

The VFD may be operable to initially reduce the frequency of the power received from the grid to an initial value, which is for example between 2 Hz and 10 Hz, and preferably about 5 Hz (compared to typically 50 or 60 Hz on the grid).

In one embodiment, the VFD is operable to provide power to the generator constantly at the initial frequency, until the bypass relay is activated and the generator is connected directly to the grid. That is, the generator receives power at only one (low) frequency before connection to the grid (and subsequently receives power at the grid frequency). The constant frequency may be in the range of about 2 Hz to 10 Hz, more preferably 4 Hz to 8 Hz, and is preferably about 5 Hz.

In alternative embodiments, the VFD is operable to provide power at an increasing frequency to the generator. Preferably, the VFD is operable to increase the frequency of the power provided to the generator from the initial value up to the grid-frequency. The VFD is preferably operable to increase the frequency of the power provided to the generator from the initial value up to the grid-frequency over a time period which is less than 20 seconds, more preferably less than 10 seconds, and most preferably less than 5 seconds. Preferably, the VFD is operable to increase the frequency of the power provided to the generator from the initial value up to the grid-frequency within 2 seconds. The optimal time is dependent on the size of the engine. The time period should be long enough that the first compression of the engine has been carried out whilst the frequency is low and the torque is high.

This VFD may be operable to increase the frequency of power provided to the generator in a step-wise fashion. That is, the generator receives power at a series of discrete frequency values before connection to the grid (and subsequently receives power at the grid frequency). From the initial value, the frequency may be stepped up to a higher frequency (for example, 15 to 20 Hz) and then to a higher frequency still (for example, then 30 to 40 Hz). There may be any number of steps, and the duration of each step is not particularly limited. The steps may be of any size.

Alternatively, the VFD may be operable to apply a continuously increasing frequency to the generator, for at least a period of time during which the VFD is active. That is, the VFD may be operable to ramp-up (i.e. increase gradually) the frequency of the power provided to the generator. The function of increasing frequency with respect to time may take any shape, but will be monotonically increasing. The increasing frequency may be proportional to time (that is, the function of frequency with respect to time is a straight line).

In embodiments where the VFD is operable to provide an increasing frequency to the generator (whether this be step-wise or continuous), the VFD may be operable to maintain the frequency of the power at the initial value for a short period of time (for example less than 10 seconds, less than 5 seconds, or less that 2 seconds) prior to increasing the frequency of the power provided to the generator. This time period may be long enough that the first compression of the engine is carried out whilst the frequency is maintained at the initial value, i.e. whilst the frequency is lowest and the torque is greatest.

Use of the VFD as described above allows the generator to be started smoothly, which ensures a longer service life for the generator.

The starter system may be configured to activate the bypass relay in order to bypass the VFD after the frequency at the generator has been matched to the frequency of the grid.

In some preferred examples, the CHP unit includes an internal combustion engine as the prime mover. Preferably the system is configured such that internal combustion within the engine does not start immediately after the generator begins operating. Rather, a period of time is allowed to elapse after the generator is initialised before internal combustion begins, this time period being sufficient to allow for ventilation of uncombusted gases from the chimney. This is a safety feature that is particularly relevant to CHP units, since the CHP chimney often passes through an indoor space before venting to the atmosphere. Preferably the period of time is greater than 5 seconds, more preferably greater than 10 seconds, and most preferably 15 seconds or greater. Preferably the period of time is less than 30 seconds, more preferably less than 20 seconds. In some examples the engine is turned by the generator for about 15 seconds before internal combustion is started. Preferably, internal combustion within the engine does not begin until after the bypass relay is activated. In preferred examples the bypass relay is activated some time before internal combustion is begun, since typically the generator frequency and grid frequency will be matched within a few seconds, with the engine then being turned over for additional time before combustion is started.

The VFD may operate according to an algorithm which determines the frequency needed to apply maximum torque. This allows for the first compression to be carried out under the highest possible torque, but also allows the engine to be sped up to the synchronous speed within a short time.

Preferably, the starter system comprises a controller. The controller may be operable to control the VFD and/or the bypass relay to operate as set out above.

Thus, the controller may be operable to: initially connect the generator to the grid via the variable frequency drive; control the variable frequency drive to reduce the frequency of the power supplied from the grid to an initial value, for supply to the generator; and control the bypass relay to bypass the variable frequency drive, allowing direct connection between the grid and the generator, such that the variable frequency drive is controlled to operate temporarily during start up. The controller may also control the variable frequency drive to increase the frequency of the power provided to the generator, preferably in order to match the generator frequency with a grid frequency.

The controller may also be arranged to control the engine of the CHP unit, or to interact with an engine controller, for example to initiate internal combustion after a required delay allowing for ventilation of the exhaust system.

Preferably, the controller is operable to measure the CHP speed, (i.e. the speed of revolution of the engine) and is configured to operate the VFD to increase the frequency based on the CHP speed. That is, the controller may operate the VFD according to an algorithm that uses the engine speed and determines the frequency needed to apply maximum torque. This allows for the first compression to be carried out under the highest possible torque, but also allows the engine to be sped up to the synchronous speed within a short time.

In one example, the CHP comprises a four-pole generator. This gives a synchronous speed that is half the frequency of the grid to which it is connected. When the grid frequency is 50 Hz, the synchronous speed is 25 revolutions per second.

In preferred embodiments, the controller is configured to monitor the CHP voltage and is configured to control the bypass relay to bypass the VFD when the CHP voltage is synchronized to the grid voltage. As a result, large coupling currents (due to phase-angle misalignment between the grid voltage and CHP voltage) are avoided when the bypass relay is closed. This allows a bypass relay with a lower rating to be used, and also ensures a longer lifetime of the CHP. In these embodiments, the controller may comprise a sensor (preferably comprising a phase-locked loop system) for detecting the grid voltage phase angle.

Preferably, when the generator reaches the nominal speed and the phases are synchronised between the generator and the grid, the generator is connected directly to the grid via the bypass relay and the VFD is bypassed.

Whilst in some embodiments the VFD is configured to be active only during start up of the CHP, in other embodiments, the VFD may also be operable to be partially active after start up (either constantly or temporarily). Correspondingly, in embodiments with a controller, the controller may be operable to control the VFD to be partially active after start up of the CHP, as well as during start up.

For example, the VFD may be used for power factor correction, if the VFD output stage (generator-side stage) is kept active during normal operation. The generator consumes reactive current, and inductive current is drawn from the grid. The reactive current level depends on the actual voltage level and the generator phase angle ($\varphi$), both of which may vary whilst the CHP is operating. To compensate for this variability, it is known to provide a capacitor bank, and to switch the capacitors in and out. Instead of providing a capacitor bank, the starter system can constantly control the CHP phase angle to a specific level by using the VFD in normal operation. This significantly simplifies the installation (because the capacitor bank need not be provided) and reduces costs.

Alternatively or in addition, the VFD may be used to keep the generator going during grid fall out. During grid fall out the grid voltage drops, such that insufficient reactive current is supplied to the generator and the generator stops. However, the VFD can be used to supply the generator with reactive current during grid fall out, thereby keeping the generator operating.

Even if the VFD is partially active after start up, the amount of time that it is active and/or the way that the VFD is used is such that the requirements for heat dissipation and/or electrical shielding is still greatly reduced compared to prior art continuous use VFDs.

The controller may be configured to output information regarding the power flowing from/into the CHP. The information may be output via a network connection, and may be transferred via the internet, for example to a central control centre, or a remote monitoring station.

The controller may be configured to decouple the CHP from the grid in case of abnormal grid voltage and/or grid frequency. This protects the CHP from the abnormal grid voltage and/or grid frequency.

Preferably the starter system is operable to limit the inrush current drawn from the grid to below 50 A, more preferably below 25 A, and most preferably below 10 A.

In some embodiments, the starter system may be integral with the generator. Alternatively, the starter system may be provided as a separate unit distinct from the generator. Therefore, the starter system may be retrofitted to an existing CHP system. In such embodiments, the starter system may be sized to have the same dimensions (or smaller) than existing soft starters, allowing replacement of an existing soft starter with the starter system of the present invention. A further advantage is that there is no need to provide an inverter on the grid side.

The invention also extends to a combined heat and power unit comprising the starter system as described above.

Thus, a second aspect of the present invention provides a combined heat and power unit comprising: a generator which is connectable to the grid; and a starter system for start up of the combined heat and power unit, wherein the starter system comprises: a variable frequency drive operable to receive power from the grid, to reduce the frequency of the power, and to provide the reduced-frequency power to the generator; and a bypass relay configured to bypass the variable frequency drive, allowing direct connection between the grid and the generator, and wherein the variable frequency drive is configured to operate temporarily during start up.

The CHP unit may further include other features of the starter system as described above, for example a controller for controlling the VFD and/or bypass relay as discussed above.

The invention also extends to a method of starting a CHP unit using the starter system described above.

A third aspect of the present invention hence provides a method of starting a combined heat and power unit, the combined heat and power unit comprising a generator, wherein the generator is connectable to the grid via a variable frequency drive which provides a first connection between the generator and the grid or via a bypass relay which provides a second connection between the generator and the grid, the method comprising: initially connecting the generator to the grid via the first connection only to start the generator; operating the VFD to reduce the frequency of the grid power to an initial frequency; and operating the bypass relay to connect the generator to the grid via the second connection only after the generator has started, such that the VFD is active temporarily during start up of the combined heat and power unit. The features discussed above in respect of the starter system may also be present in the method of this aspect.

In some embodiments, the frequency of the power provided to the generator from the VFD is maintained at the initial frequency. That is, the generator receives power at only one (low) frequency before connection to the grid (and subsequently receives power at the grid frequency). The constant frequency may be in the range of about 2 Hz to 10 Hz, more preferably 4 Hz to 8 Hz, and is preferably about 5 Hz.

Alternatively, the frequency of the power provided to the generator is increased from the initial value. Preferably, the frequency of the power provided to the generator is increased from the initial value to the grid-frequency. The frequency of the power provided to the generator may be increased from the initial value up to the grid-frequency over a time period which is less than 20 seconds, more preferably less than 10 seconds, and most preferably less than 5 seconds. Preferably, the frequency of the power provided to the generator may be increased from the initial value up to the grid-frequency within 2 seconds.

The frequency of the power provided to the generator may be increased in a step-wise fashion. From the initial value, the frequency may be stepped up to a higher frequency (for example, 15 to 20 Hz) and then to a higher frequency still (for example, 30 to 40 Hz). There may be any number of steps, and the duration of each step is not particularly limited. The steps may be of any appropriate size.

Alternatively, the frequency may increase continuously for at least a period of time. That is, the frequency of the power supplied to the generator may be ramped-up (i.e. increased gradually). The function of increasing frequency with respect to time may take any shape, but will be monotonically increasing. The increasing frequency may be proportional to time (that is, the function of frequency with respect to time is a straight line).

In embodiments where the frequency increases (whether this be step-wise or continuously), the method may include maintaining the frequency of the power at the initial value for a short period of time (for example less than 10 seconds, less than 5 seconds, or less that 2 seconds) prior to increasing the frequency of the power provided to the generator. This time period may be long enough that the first compression of the engine is carried out whilst the frequency is maintained at the initial value, i.e. whilst the frequency is lowest and the torque is greatest. The initial value may be between 2 Hz and 10 Hz, and preferably is about 5 Hz.

The CHP unit may have an internal combustion engine as the prime-mover, and preferably, the method includes allowing a period of time to elapse after the generator is initialised before starting internal combustion in the engine. Preferably the period of time is greater than 5 seconds, more preferably greater than 10 seconds, and most preferably 15 seconds or greater. Preferably the period of time is less than 30 seconds, more preferably less than 20 seconds. In a preferred example the period of time is about 15 seconds. The bypass relay may be operated to directly connect the generator to the grid via the second connection before the internal combustion engine is started as discussed above.

The method may include measuring the CHP speed, and controlling the VFD to increase the electrical frequency based on the CHP speed.

In preferred embodiments, the method comprises monitoring the CHP voltage and operating the bypass relay to directly connect the generator to the grid via the second connection once the CHP voltage is synchronized to the grid voltage.

Preferably, the method includes outputting information regarding the power flowing from/into the CHP.

Preferably, the method includes decoupling the CHP from the grid in case of abnormal grid voltage and/or grid frequency. This protects the CHP from the abnormal grid voltage and/or grid frequency.

The method may include partially activating the VFD after start up (either constantly or temporarily). For example, the VFD may be used for power factor correction, by keeping the VFD output stage active during normal operation.

Alternatively or in addition, the VFD may be used to supply the generator with reactive current during grid fall out, thereby keeping the generator operating.

Where applicable, the advantages of the preferred/optional features set out above in respect of the first and second aspects of the present invention apply equally to the preferred/optional features of the third aspect of the present invention.

Certain preferred embodiments of the invention will now be described in greater detail by way of example only and with reference to the accompanying figures in which.

Figure 1:
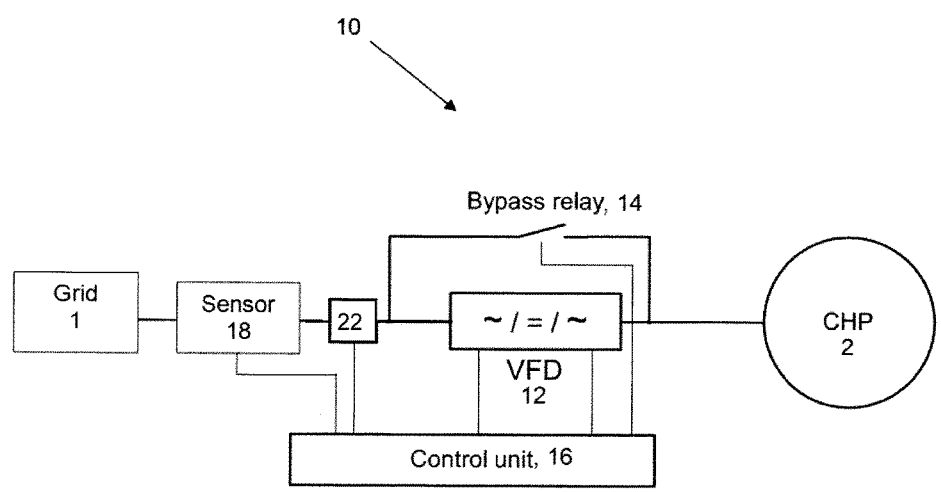
FIG. 1 shows a schematic of a starter system connected to a CHP and the grid.

FIG. 1 shows a CHP unit 2 (comprising an induction generator and a combustion engine, not shown) connected to the grid 1. A starter system 10 for the CHP comprises a variable frequency drive 12 and a bypass relay 14. Each of these components is connected between the grid and the CHP, and provides an alternative connection between the grid and the CHP. That is, the variable frequency drive 12 and bypass relay 14 are connected in parallel.

The starter system 10 also includes a controller 16. The controller 16 is in communication with the variable frequency drive 12 and the bypass relay 14, and is configured to control both these components. The controller 16 is also configured to receive input data from a grid sensor 18, which monitors the voltage and current supplied by the grid. The grid sensor 18 includes a phase locked loop to measure the phase angle of the grid voltage. The controller 16 is also configured to receive input data from a sensor (not shown) configured to measure the speed of the engine. The controller is also configured to output data concerning the operation of the CHP to a network connection (not shown). The controller also controls switch/relay 22.

The starter system 10 is not provided with heat exchangers or electrical shielding; this is not necessary, since the VFD is not in operation for a long period of time.

The heat to be removed from the system is mainly the heat lost from the bypass relay 14. In an exemplary starter system 10 for a 20 kW CHP unit, 12 W of power is dissipated in the starter system 10 during normal operation. The time for start up is so short that the components of the starter system 10 do not get hot; the temperature may rise by approximately 5° C., but this will not have a significant effect on any of the components. The starter system 10 is large enough to dissipate the produced heat by convection from its surfaces, for example, from an aluminium casing (not shown). For comparison, a VFD with 5% losses connected to the same 20 kW CHP unit produces 1,000 W of heat that must be dissipated. For continuous-use VFDs, dissipation of this heat is a significant design consideration.

Figure 2:
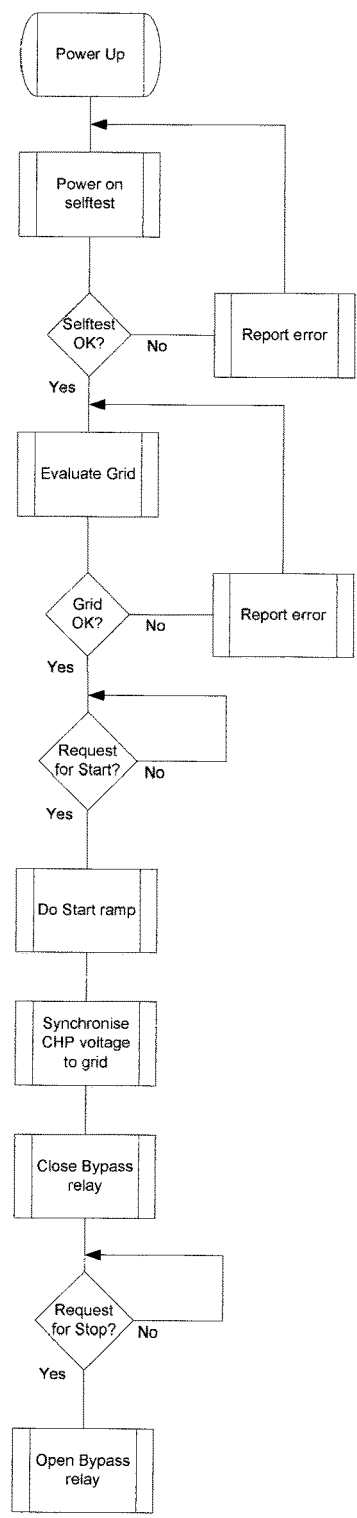
FIG. 2 shows a summary of the control steps executed by the starter system.

The control steps executed by the controller 16 are shown schematically in FIG. 2. When the starter system is initialised, the controller 16 performs a diagnostic of the CHP 2 and/or the starter system 10 and reports any error found. If no errors are found, the controller 16 performs a diagnostic of the grid 1, based on information from the grid sensor 18. Any errors that are found are reported. In the event that no errors are found, the controller 16 checks whether a request has been made to start up the CHP. If not, the controller 16 waits. If such a request has been made, the controller 16 initialises start up of the CHP.

Figure 3:
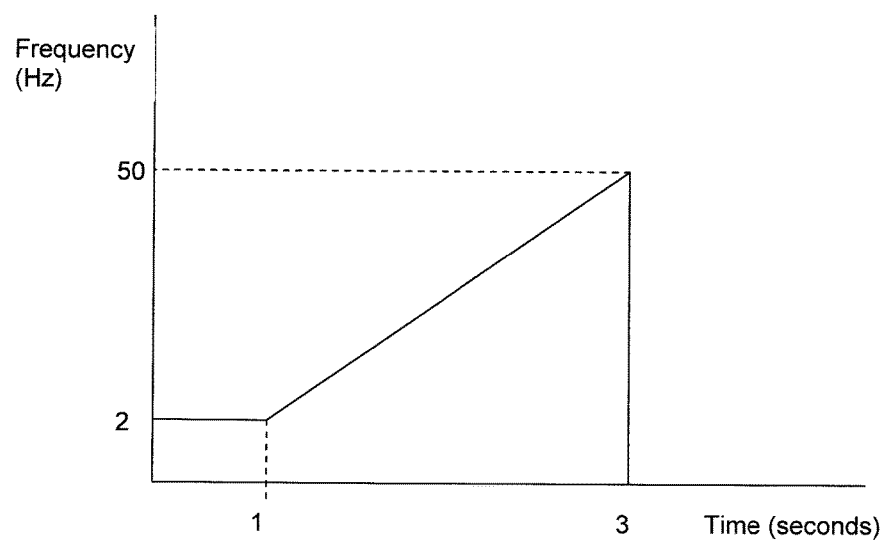
FIG. 3 shows the frequency of the power output by the VFD to the generator as a function of time.

Prior to initialisation of the CHP, the switch 22 is open, such that there is no connection between the grid and generator. The bypass relay 14 is also open. On initialising start up of the CHP, the controller 16 closes switch 22, thereby providing a connection from the grid 1 to the generator 2 via the variable frequency drive 12. The controller 16 controls the variable frequency drive 12 to supply to the generator power at a lower frequency than that received from the grid, and then to increase (i.e. ramp up) the frequency to the grid frequency. The frequency of the power supplied to the generator is shown as a function of time in FIG. 3. In this example the controller 16 controls the variable frequency drive 12 to initially reduce the frequency of the power received from the grid to 2 Hz. The frequency is maintained at this initial value for 1 second. Subsequently, the controller 16 controls the variable frequency drive 12 to ramp up the frequency. In this example, the frequency is ramped up from 2 Hz to 50 Hz (the grid frequency) within 2 seconds. When the generator 2 is synchronized to the grid voltage, the controller closes the bypass relay 14 to connect the generator 2 directly to the grid 1, bypassing the variable frequency drive 12.

In this example the prime-mover for the CHP unit is an internal combustion engine and the generator start-up hence also acts to turn the engine over. After the bypass relay 14 has been closed then the generator is operated as a motor for a period of time before the internal combustion is started in order to allow the exhaust system of the engine to be ventilated. This may for example be around 10 seconds or so. After this delay the internal combustion engine is started and the CHP unit then operates in a normal running mode, with the engine providing the power to turn the generator to thereby generate electricity.

By starting the CHP in this way, the inrush current drawn from the grid is limited to acceptable levels (by virtue of the provision of the VFD). The starter system 10 also allows the VFD to be bypassed once the generator is running, allowing direct connection between the generator and grid. The bypass relay has a significantly higher efficiency than the VFD and so by closing the bypass relay in normal operation (i.e. after start up), the total efficiency of the CHP is increased dramatically. In this way the CHP operates efficiently both during the start phase and during normal operation.

Additionally, since the VFD only operates for a short time, much less heat is generated compared to the configuration in which the VFD operates continuously whilst the CHP is operating. This means embodiments of the present invention are much more efficient compared to prior art systems, and do not require extensive heat dissipation apparatus or electrical shielding. The reduced heat load also extends the service life of the generator and starter system.

The invention claimed is:

1. A combined heat and power unit comprising a generator which is connectable to the grid and a starter system for start up of the combined heat and power unit,
   wherein the starter system comprises:
      a variable frequency drive, VFD, operable to receive power from the grid, to reduce the frequency of the power, and to provide the reduced-frequency power to the generator to start the generator; and
      a bypass relay configured to bypass the VFD, allowing direct connection between the grid and the generator after the generator has started,
   and wherein the variable frequency drive is configured to operate temporarily during start up of the combined heat and power unit.

2. A combined heat and power unit according to claim 1, wherein the starter system comprises heat dissipation devices that would be insufficient for dissipation of heat from the VFD in continuous operation and/or the starter system has electrical shielding that would be inadequate for allowing the VFD to be used in continuous operation.

3. A combined heat and power unit according to claim 1, wherein the starter system does not include any heat dissipation devices whose purpose is solely to dissipate heat generated by the VFD, and/or does not include any electrical shielding whose purpose is solely to shield the starter system from electromagnetic fields generated by the VFD or bypass relay.

4. A combined heat and power unit according to claim 1, wherein the VFD is operable to initially reduce the frequency of the power received from the grid to an initial value, and wherein the initial value is between 2 Hz and 10 Hz.

5. A combined heat and power unit according to claim 4, wherein the VFD is operable to subsequently increase the frequency of the power provided to the generator from the initial value up to the grid-frequency, over a time period which is less than 20 seconds.

6. A combined heat and power unit according to claim 5, wherein the VFD is operable to maintain the frequency of the power at the initial value for a period of time of less than 10 seconds, less than 5 seconds, or less that 2 seconds prior to increasing the frequency of the power provided to the generator.

7. A combined heat and power unit according claim 5, wherein the starter system is configured to activate the bypass relay in order to bypass the VFD after the frequency at the generator has been matched to the frequency of the grid.

8. A combined heat and power unit according to claim 6, wherein the combined heat and power unit comprises an internal combustion engine and the starter system is configured such that the first compression of the internal combustion engine takes place during the period of time for which the VFD maintains the frequency of the power at the initial value.

9. A combined heat and power unit according to claim 1, wherein the combined heat and power unit comprises an internal combustion engine and the starter system is configured such that a period of time is allowed to elapse after the generator is started before internal combustion begins in the internal combustion engine, wherein this period is between 5 and 30 seconds.

10. A combined heat and power unit according to claim 1, wherein the combined heat and power unit comprises an internal combustion engine and the starter system is configured such that a period of time is allowed to elapse after the bypass relay is activated before internal combustion begins in the internal combustion engine,
wherein this period is between 1 and 25 seconds.

11. A combined heat and power unit according to claim 1, wherein the VFD is operable to be partially active after start up of the CHP unit, either constantly or temporarily.

12. A combined heat and power unit according to claim 11, wherein the VFD is configured to be used for power factor correction, by keeping the VFD output stage active after start up of the CHP unit to control the CHP phase angle to a specific level.

13. A combined heat and power unit according to claim 11, wherein the VFD is operable to supply the generator with reactive current in the event of grid fall out.

14. A combined heat and power unit according to claim 1, wherein the starter system comprises a controller configured to control the VFD and/or bypass relay.

15. A combined heat and power unit according to claim 14, wherein the combined heat and power unit comprises an internal combustion engine and the controller is operable to measure the speed of revolution of the engine and is configured to operate the VFD to increase the frequency based on the speed of revolution of the engine, to apply maximum torque.

16. A combined heat and power unit according to claim 14, wherein the controller is configured to monitor the CHP voltage and is configured to control the bypass relay to bypass the VFD when the CHP voltage is synchronized to the grid voltage.

17. A combined heat and power unit according to claim 16, wherein the controller comprises a sensor including a phase-locked loop system for detecting the grid voltage phase angle.

18. A method of starting a combined heat and power unit, the combined heat and power unit comprising a generator, wherein the generator is connectable to the grid via a variable frequency drive, VFD, which provides a first connection between the generator and the grid or via a bypass relay which provides a second connection between the generator and the grid, the method comprising:
    initially connecting the generator to the grid via the first connection only to start the generator;
    operating the VFD to reduce the frequency of the grid power to an initial frequency; and
    operating the bypass relay to connect the generator to the grid via the second connection only after the generator has started, such that the VFD is active temporarily during start up of the combined heat and power unit.

19. A method according to claim 18 wherein the CHP unit comprises an internal combustion engine as the prime-mover, and wherein the method comprises measuring the engine speed, and controlling the VFD to increase the frequency based on the engine speed.

20. A method according to any of claim 18, comprising partially activating the VFD after start up, either constantly or temporarily and using the VFD for power factor correction, by keeping the VFD output stage active after start up of the CHP unit.

* * * * *